United States Patent
Torres (10) Patent No.: US 6,725,263 B1
(45) Date of Patent: Apr. 20, 2004

(54) SYSTEMS AND METHODS FOR ANALYZING NETWORK TRAFFIC

(75) Inventor: Marcelo Javier Torres, Cambridge, MA (US)

(73) Assignee: Level 3 Communications, Inc., Broomfield, CO (US)

( * ) Notice: Subject to any disclaimer, the term of this patent is extended or adjusted under 35 U.S.C. 154(b) by 0 days.

(21) Appl. No.: 09/531,882

(22) Filed: Mar. 21, 2000

(51) Int. Cl.$^7$ ............................................. G06F 15/173
(52) U.S. Cl. ...................... 709/223; 709/224; 709/227; 370/234
(58) Field of Search ................. 709/227, 223, 709/224, 203; 714/39, 47, 43; 370/234, 358

(56) References Cited

U.S. PATENT DOCUMENTS

| | | | | |
|---|---|---|---|---|
| 4,775,973 A | * | 10/1988 | Tomberlin et al. | 370/253 |
| 5,253,161 A | * | 10/1993 | Nemirovsky et al. | 709/241 |
| 5,539,659 A | * | 7/1996 | McKee et al. | 709/224 |
| 5,974,457 A | * | 10/1999 | Waclawsky et al. | 709/224 |
| 6,061,331 A | * | 5/2000 | Conway et al. | 370/232 |
| 6,360,261 B1 | * | 3/2002 | Boyd et al. | 709/224 |
| 6,421,435 B1 | * | 7/2002 | Bastien et al. | 379/133 |

OTHER PUBLICATIONS

Leijon, H. "Froecasting Theories"; ITU Project Plantitu Doc–61–E, Online!; Nov. 13, 1998.*

Leijoh, H. "Forecasting Theories"; ITU Project Planitu Doc–61–E, Online!; Nov. 13, 1998; XP0012183021; URL:http:www.itu.int/itudoc//itu–d/dept/psp/ssb/planitu/plandoc/fctheor.html.

Sundareswaren, et al. "Netanalyzer: A Retrospective Network Analysis Tool"; International Journal of Computers & Applications, ACTA Press, Anaheim, California; vol. 19, No. 2, pp. 77–83, 1997.

* cited by examiner

Primary Examiner—Zarni Maung
Assistant Examiner—Sahera Halim
(74) Attorney, Agent, or Firm—Paegre & Benson LLP (57) ABSTRACT

A method for analyzing traffic in a system (100) having a plurality of nodes (110, 120, 130) is provided. The method includes forecasting a total amount of traffic transmitted to and from each of the plurality of nodes (110, 120, 130) based on observed traffic statistics and an estimated growth. The method also includes generating a traffic matrix using the observed traffic statistics and the forecasted traffic associated with each of the plurality of nodes (110, 120, 130). The method may also include using the traffic matrix to determine projected traffic between each of the plurality of nodes (110, 120, 130).

30 Claims, 4 Drawing Sheets

SYSTEMS AND METHODS FOR ANALYZING NETWORK TRAFFIC

FIELD OF THE INVENTION

The present invention relates generally to networks and, more particularly, to forecasting traffic flows on a network.

BACKGROUND OF THE INVENTION

Spurred by technological advances, the telecommunications industry has experienced tremendous growth over the last decade. This is especially true of networks that carry packetized data, such as those networks that make up the Internet. Within the Internet sector, various Internet Service Providers (ISPs) have reported a yearly quadrupling of traffic. As a result, the traffic on networks is rapidly exceeding system capacity. Network planners, therefore, are constantly faced with the issue of whether the network has adequate capacity to support future traffic requirements.

Traffic forecasts are a particularly important component of the capacity planning and budget modeling functions performed by network planners. Given a particular network topology, a network planner uses a traffic forecast to evaluate anticipated circuit utilizations. These circuit utilizations may then be translated into circuit requirements. The network planner may also use a traffic forecast to evaluate various topologies and establish a network build-out plan according to this evaluation.

In general, a network planner is provided with traffic growth estimates. These growth estimates are then combined with actual collected traffic flow statistics to assemble a predictive traffic model.

Typically, the most time-consuming part of the capacity planning and budgeting process is the construction of a traffic matrix that represents the traffic forecasts. Most ISPs serve millions of sources and destinations of traffic, known as hosts. Consequently, a traffic matrix that captures enough information to be meaningful in a network planning context may be very large.

One drawback with conventional traffic forecasting methodology is that the mechanics involved in creating the traffic matrices are not systematic. As a result, the generated circuit utilization data is often unreliable.

Therefore, a need exists for a system and method that provide a systematic approach to traffic forecasting.

SUMMARY OF THE INVENTION

Systems and methods consistent with the present invention address this and other needs by combining observed traffic statistics and projected traffic data in a systematic manner to generate a traffic matrix. The traffic matrix may then be manipulated to generate expected flows to/from each of the nodes in a network.

In accordance with the purpose of the invention as embodied and broadly described herein, a method for analyzing traffic in a network having a plurality of nodes is provided. The method includes forecasting traffic transmitted to and from each of the plurality of nodes based on observed traffic statistics and an estimated growth. The method also includes generating a traffic matrix using the observed traffic statistics and the forecasted traffic associated with each of the plurality of nodes and determining projected traffic between each of the plurality of nodes using the generated traffic matrix.

In another aspect of the present invention, a system for analyzing traffic in a network comprising a plurality of nodes includes a memory configured to store observed traffic statistics. The system also includes a processor configured to forecast traffic transmitted to and from each of the plurality of nodes based on observed traffic statistics and an estimated growth. The processor is also configured to generate a traffic matrix using the observed traffic statistics and the forecasted amount of traffic associated with each of the plurality of nodes and determine projected traffic between each of the plurality of nodes using the generated traffic matrix.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

The present invention will be described in connection with forecasting traffic over a network, such as the Internet. It will become apparent, however, that the present invention is also application to other networks, such as a local area network (LAN), a wide area network (WAN), an intranet or another type of network, as described in detail below.

System Overview

The Internet is organized into a collection of Internet Protocol (IP) networks, otherwise known as autonomous systems (ASs). Each AS is administered by a single entity, such as an ISP, a large corporation or a university. In order for traffic to be exchanged between hosts that belong to or are connected to separate ASs, each peer AS advertises the set of hosts that can be reached through its particular IP network. In cases where the traffic destination host is not serviced by the source AS, the source IP network delivers the traffic to the AS that advertises the host address. Otherwise, the source IP network delivers the traffic according to the network's internal routing protocol to a point of presence (POP) that services the destination host address.

Systems and methods consistent with the present invention use this host address organization as a mechanism from which to derive an aggregate traffic model. Namely, the traffic model associated with the forecast characterizes nodes that aggregate various hosts according to the AS that advertises the host addresses. For hosts that are serviced by the particular IP network for which capacity planning is being performed, the hosts' addresses may be further broken down geographically according to the POP that provides network connectivity to the particular host, in implementations consistent with the present invention. The set of hosts serviced at a particular POP may belong to a set of customers that are provided Internet access via that particular POP.

Systems and methods consistent with the present invention provide a systematic process for generating traffic forecasts. The process uses inputs representing future traffic growth and observed traffic statistics to generate a traffic matrix. The traffic matrix may then be used to plan capacity for a single AS, hereafter referred to as the "model AS." Each entry in the traffic matrix, consistent with the present invention and described in more detail below, may represent predicted or observed traffic rates for traffic exchanged between: 1) an aggregate of hosts served by a POP on the model AS and an aggregate of hosts served by another AS; 2) an aggregate of hosts served by a POP on the model AS and an aggregate of hosts served by another POP on the model AS; or 3) an aggregate of hosts served by a pair of ASs that are not the model AS.

Exemplary Network

Figure 1:
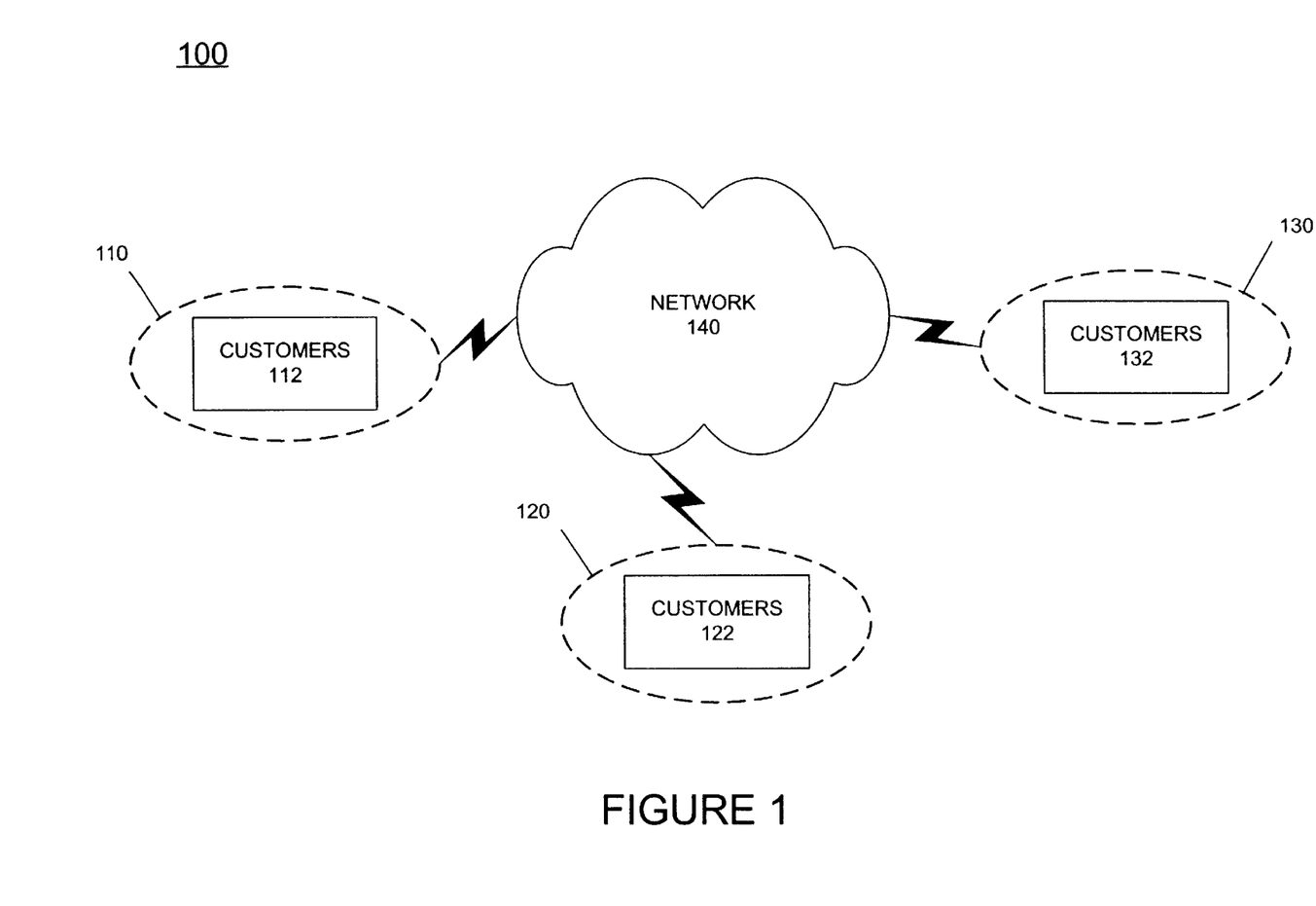
FIG. 1 illustrates an exemplary system consistent with the present invention.

FIG. 1 illustrates an exemplary system 100 in which methods and systems, consistent with the present invention, may be implemented. In FIG. 1, system 100 represents a "virtual node" model that includes virtual nodes 110, 120 and 130 and network 140. Each of the virtual nodes 110, 120 and 130 represents a logical aggregation of hosts associated with customers 112, 122 and 132, respectively.

The data sources/destinations that comprise these hosts may include computers, workstations, servers, printers and any other type of device that may transmit/receive data to/from various points in system 100. Moreover, the data sources/destinations may include devices, such as a personal digital assistant (PDA), which connect to system 100 via a wireless connection.

Customers 112 and 122, consistent with the present invention, may be served by the model AS and may connect to the model AS via a conventional Internet access circuit (not shown). Customers 132, consistent with the present invention, may be served by an AS different from the AS serving nodes 110 and-120. Network 140, consistent with the present invention, may represent a model network connecting the virtual nodes 110–130 to each other.

According to an exemplary implementation of the present invention, system 100 may comprise the entire Internet and the aggregation of traffic associated with each virtual node may be represented by a collection of prefixes associated with Internet traffic. Alternatively, system 100 may comprise a subset of the Internet, an intranet, a WAN, a LAN or another network.

Each virtual node 110, 120 and 130, consistent with the present invention, may also be associated with a service type. That is, the traffic generated by a virtual node may be modeled as coming from a number of lines of business associated with a network service provider, such as GTE Internetworking. For example, a virtual node may include digital subscriber line (DSL) customers, various corporate customers, web hosting stations, a peering interface, etc.

The virtual node model assumes that each virtual node 110, 120 and 130 feeds a set of edge interfaces at the backbone routers (not shown) interconnecting the virtual nodes. Each virtual node 110–130 may also include internal routers that route information within the respective virtual node and external routers (not shown) that route information via network 140 to the other virtual nodes.

The number of components illustrated in FIG. 1 is provided for simplicity. In practice, a typical system 100 often includes a larger number of virtual nodes, in addition to internal and external routers, local networks, and data nodes (not shown). More specifically, only two virtual nodes associated with the model AS and one virtual node associated with a peer AS are shown. It should be understood that any number of additional virtual nodes associated with the model AS and any number of peer ASs may also be included in system 100.

Exemplary System

Figure 2:
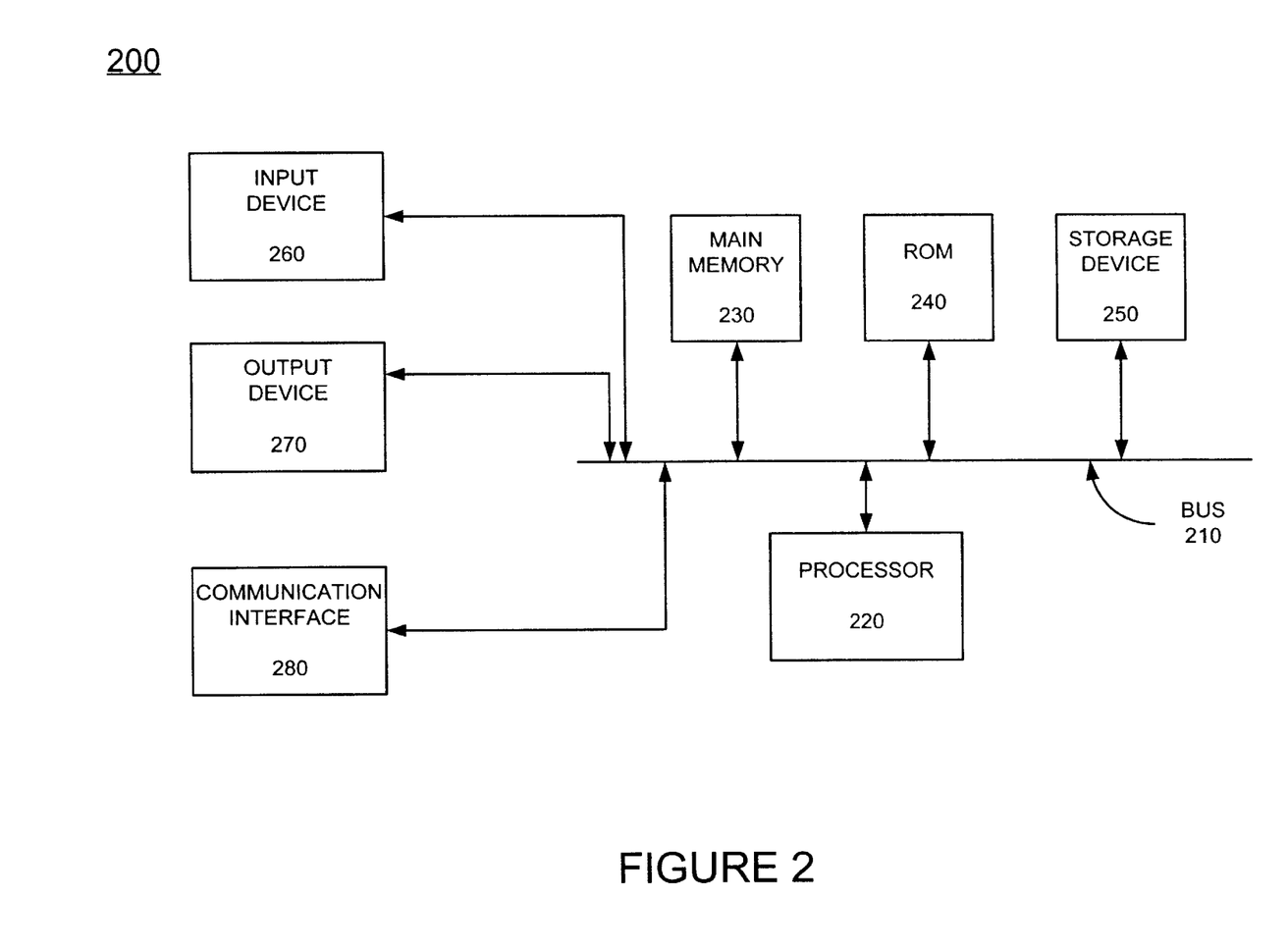
FIG. 2 is a block diagram of an exemplary system in which systems and methods consistent with the present invention may be implemented.

FIG. 2 illustrates an exemplary system in which a system and method, consistent with the present invention, may be implemented. In FIG. 2, the exemplary system 200 includes a bus 210, a processor 220, a main memory 230, a read only memory (ROM) 240, a storage device 250, an input device 260, an output device 270, and a communication interface 280. The bus 210 permits communication among the components of the system 200.

The processor 220 may include any type of conventional processor or microprocessor that interprets and executes instructions. Main memory 230 may be a random access memory (RAM) or other dynamic storage device that stores information and instructions for execution by processor 220. Main memory 230 may also store temporary variables or other intermediate information during execution of instructions by processor 220. The ROM 240 may include a conventional ROM device or another type of static storage device that stores static information and instructions for processor 220. The storage device 250 may include any type of magnetic or optical recording medium and its corresponding drive, such as a magnetic disk or optical disk and its corresponding disk drive.

The input device 260 may include any conventional mechanism that permits an operator to input information to the system 200, such as a keyboard, a mouse, a pen, voice recognition and/or biometric mechanisms, etc. The output device 270 may include any conventional mechanism that outputs information to the operator, including a display; a printer, a pair of speakers, etc. The communication interface 280 may include any transceiver-like mechanism that enables the system 200 to communicate with other devices and/or systems. For example, the communication interface 280 may include mechanisms, such as a modem or an Ethernet interface, for communicating via a data network, such as the Internet, an intranet, LAN or WAN.

The system 200, consistent with the present invention, performs the functions necessary to generate a traffic matrix in response to processor 220 executing sequences of instructions contained in memory 230. Such instructions may be read into memory 230 from another computer-readable medium, such as a data storage device 250, or from a separate device via communication interface 280. Execution of the sequences of instructions contained in memory 230 causes processor 220 to perform the process steps that will be described hereafter. In alternative embodiments, hardwired circuitry may be used in place of or in combination with software instructions to implement the present invention. Thus, the present invention is not limited to any specific combination of hardware circuitry and software.

Exemplary Processing for Forecasting Traffic

Figure 3:
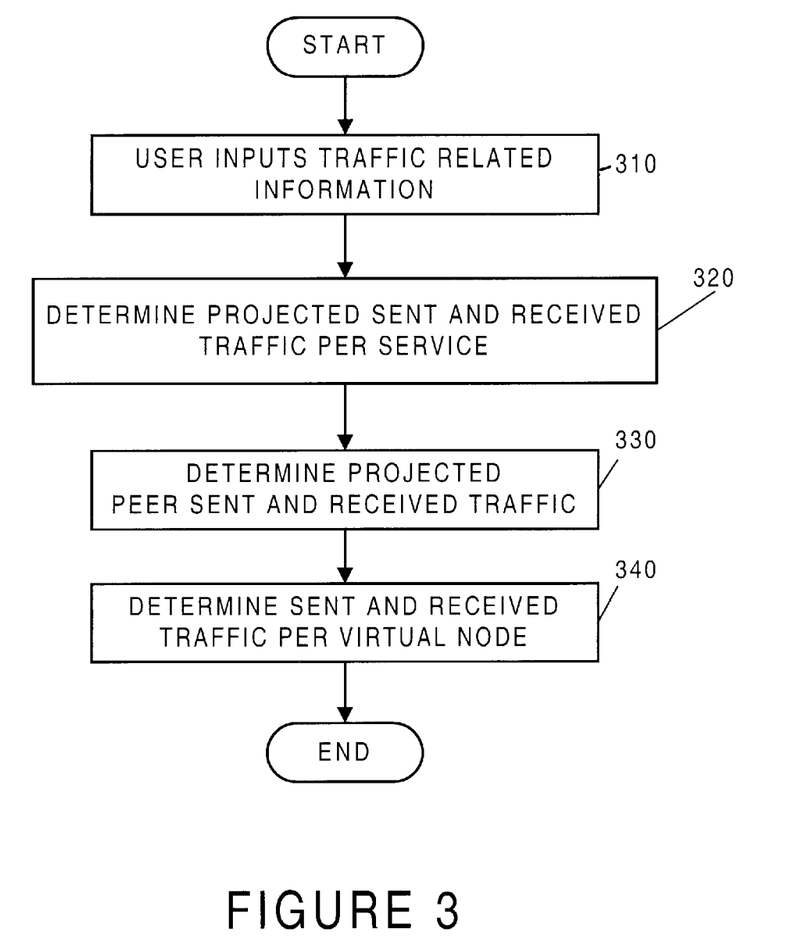
FIG. 3 is a flowchart of processing, consistent with the present invention, for determining projected traffic flows in a network.

FIG. 3 is an exemplary flow diagram, consistent with the present invention, illustrating processing for forecasting traffic on a network. Processing begins when a user, e.g., a traffic forecaster or network planner, inputs traffic related information to system 200 (step 310). This input information may include unit growth forecasts, load growth forecasts, scale forecasts, a sent/received ratio, total unit forecasts and an "onnet" factor, as described in more detail below.

The unit growth forecasts represent how many new units of each service type are anticipated between the point in time when the actual traffic flow statistics were collected and the point in time for which the forecast is being made. For example, the unit growth forecast for a particular service, such as DSL service, may represent the expected increase in the number of customers expected to use the DSL service.

The load growth forecasts represent the load that the existing nodes of each service type are projected to generate. The load may be defined as (inflow+outflow)* (1−onnet/2), where "onnet" specifies the fraction of traffic associated with a service that stays wholly within a particular network. For example, referring to FIG. 1, assume that virtual nodes 110 and 120 are virtual nodes of a first network service provider, such as GTE Internetworking, and virtual node 130 is a peer node associated with a different network service provider. In this situation, the fraction of traffic staying wholly within the network of the service provider associated with virtual nodes 110 and 120 is the onnet fraction.

The scale forecasts represent how much the traffic associated with each respective service type is expected to increase, in the absence of any growth in units or load. For example, associated with each virtual node 110–130 (FIG. 1) in the traffic matrix is a set of customers 112–132. For these customers, the scale forecast is the expected growth in their traffic in the absence of any new unit growth. Scale forecasts, therefore, represent the projected growth in load per unit customer.

The sent/received ratio represents the sent to received ratio of traffic for nodes associated with a particular service. In situations where the sent/received ratio is not provided, the system 200 may determine the ratio using available statistics.

The total unit forecasts represent the total projected traffic transmitted to/from each of the respective virtual nodes in the network.

Depending on the type of traffic forecast desired, the user may provide some or all of the traffic-related information described above. For example, a user may provide unit growth forecasts and scale forecasts, without providing the load growth forecast. This type of input may be appropriate for certain services where aggregated models for unit behavior are appropriate, such as DSL services and corporate customers. In other types of services, such as web hosting services, the user may input load growth forecasts and a scale forecast. When the user prefers entering total unit forecasts, he/she may also input a scale factor of zero so that system 200 will ignore observed statistics in determining the total load.

When unit growth forecasts are provided, the system 200 may translate the unit quantities into units of load. For some services, the system 200 may store definitions relating to per unit load.

After receiving the input information, system 200 determines the total projected received and sent traffic per service, A and B, respectively, using the following equations (step 320):

$$A = A * s + \frac{L}{(1+R)(1-onnet)/2}$$

$$B = B * s + \frac{L * R}{(1+R)(1-onnet)/2}$$

where "A" represents the total observed traffic received per service, "B" represents the total observed traffic sent per service, "L" represents the total additional load per service, "s" represents a scale factor per service, "R" represents a sent/received ratio per service and "onnet" represents the fraction of traffic staying wholly within the network. "L" may be entered as an input by a user or determined by system 200 by multiplying the unit forecast by the per unit load values.

After determining the total projected sent and received traffic per service, A and B, system 200 determines the total traffic received from all peer nodes ($A_{peer}$) and the total traffic sent to all peers ($B_{peer}$) (step 330). As described previously, the network planner should account for traffic transmitted to/from a peer network to accurately determine the traffic forecast. The total traffic received from all peer nodes, consistent with the present invention, may be defined as:

$A_{peer} = \Sigma B(1-onnet)$.

The total traffic sent to all peer nodes, consistent with the present invention, may be defined as:

$B_{peer} = \Sigma A(1-onnet)$.

Additionally, the total sent traffic in the network must be equal to the total received traffic, i.e., $\Sigma A + A_{peer} = \Sigma B + B_{peer}$.

Based on the above equations, system 200, consistent with the present invention, determines the peer traffic using the following equations:

$$A_{peer} = \sum B - \left( \frac{\sum B * O}{2} + \frac{\sum A * O}{2} \right)$$

$$B_{peer} = \sum A - \left( \frac{\sum B * O}{2} + \frac{\sum A * O}{2} \right)$$

where "O" represents the onnet fraction and the sums are taken over the set of defined services.

At this point, the system 200 has determined the total sent and received traffic volume for each of the services and the peers. The system 200 now determines the sent and received traffic per virtual node, where summations are taken over virtual nodes belonging to the same service (step 340). According to an exemplary implementation, the system 200 determines the projected received and sent traffic per virtual node, $a_i$ and $b_j$, respectively using the following equations:

$$p_i = \frac{a_i}{\Sigma a_i}$$

$$q_j = \frac{b_j}{\Sigma b_j}$$

$$a_i = A * p_i$$

$$b_j = B * q_j$$

where "$a_i$" represents the observed flow received by node i, and "$b_j$" represents the observed flow sent by node j, "$p_i$" represents" a percentage of received traffic generated by node i for a particular service, and "$q_j$" represents a percentage of sent traffic sent by node j for a particular service. The term "$a_i$" represents the forecasted flow received by node i and the term "$b_j$" represents the forecasted flow sent by node j.

After determining the total projected sent and received traffic volumes for each virtual node, the system 200 uses the determined values, along with the observed statistics, to generate a traffic matrix and to apportion the determined volumes over the individual flows in the network.

Exemplary System Processing for Generating a Traffic Matrix and Apportioning Traffic Volumes Processing, consistent with the present invention, uses the sent/received traffic volumes calculated per virtual node to generate a traffic matrix. The system 200 then uses the calculated traffic values per virtual node to apportion the total traffic volumes over the individual data flows in the network.

Figure 4:
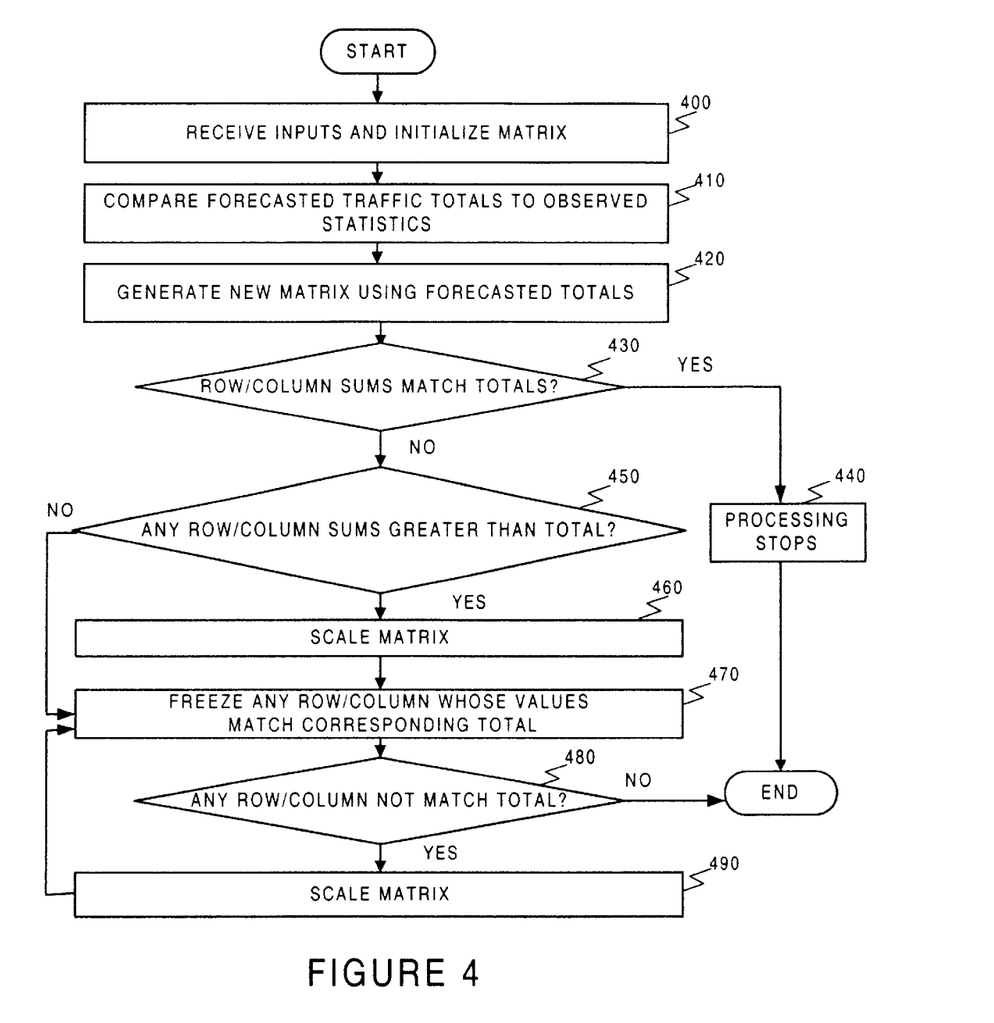
FIG. 4 is a flowchart of processing, consistent with the present invention, for using a traffic matrix to apportion traffic flows in a network.

FIG. 4 illustrates processing, consistent with the present invention, for generating a traffic matrix and manipulating the matrix to apportion the traffic. Processing begins when system 200 initializes a traffic matrix using observed traffic flow statistics (step 400). These observed traffic flow statistics may be entered into system 200 by a user, e.g., a traffic forecaster, via input device 260 or may be stored in system 200, e.g., on storage device 250 (FIG. 2).

For example, assume that the traffic matrix is based on system 100 (FIG. 1) and that virtual nodes 110 and 120 are represented by VN1 and VN2, respectively, and virtual node 130 is a peer node represented by P1. In this scenario, system 200, consistent with the present invention, may generate an initial traffic matrix having the following form:

| FROM/TO | VN1 | VN2 | P1 | TOTALRECV |
|---------|-----|-----|-----|-----------|
| VN1 | $F_{11}$ | $F_{12}$ | $F_{1P}$ | |
| VN2 | $F_{21}$ | $F_{22}$ | $F_{2P}$ | |
| P1 | $F_{P1}$ | $F_{P2}$ | $F_{PP}$ | |
| TOTALSENT | | | | | where $F_{ij}$ represents the observed traffic flow from node i to node j. The observed traffic flow statistics may be determined in any conventional manner, based on the actual data traffic between the virtual nodes 110–130. According to an exemplary implementation, the entries in the traffic matrix may represent the average flow rate in megabits per second (Mbps) over a period of time. For example, if entry $F_{12}$ was equal to "2," this would indicate that the flow from VN1 to VN2 is two Mbps over the predefined period of time. The particular period of time may be a peak hour period, a day, a week, or any other time period. Additionally, the entries may represent flow rates in units other than Mbps.

As seen from the above matrix, traffic may be transmitted entirely within a virtual node. For example, traffic may be transmitted between two data nodes within VN1. Such traffic is included in the entry represented by $F_{11}$ in the above matrix.

Assume that the observed traffic flow statistics for system 100 (FIG. 1) have been determined as illustrated in matrix 1. As described previously, these values may be input by a user or stored in memory on system 200.

| MATRIX 1 | | | | |
|----------|-----|-----|-----|-----------|
| FROM/TO | VN1 | VN2 | P1 | TOTALRECV |
| VN1 | 2 | 2 | 8 | 12 |
| VN2 | 2 | 4 | 6 | 12 |
| P1 | 0 | 0 | 0 | 0 |
| TOTALSENT | 4 | 6 | 14 | |

Now suppose that system 200 generates the following projected data for the total sent and received traffic volumes per virtual node (step 340, FIG. 3).

TABLE 1

| NODE | RECV | SENT |
|------|------|------|
| VN1 | 11 | 8 |
| VN2 | 15 | 3 |
| P1 | 0 | 15 |

Next, the system 200 compares the flow quantities in matrix 1 above to the sent and received volumes in Table 1 to determine whether to modify traffic matrix 1 (step 410). In the above example, the total received and total sent values in matrix 1 do not match the forecasted received and sent totals in Table 1. For example, the total received by VN1 in traffic matrix 1 is 12. The total received by VN1 in Table 1, however, is 11.

Since the observed flow quantity, 12, does not match the forecasted quantity, 11, the system 200 constructs a new traffic matrix (step 420). According to an exemplary implementation, the system 200 inserts the new sent and received projections from Table 1 into matrix 1. The system 200 may also remove all rows or columns having a zero sum, such as the row associated with P1 in matrix 1.

The resulting matrix may be illustrated as:

| MATRIX 2 | | | | |
|----------|-----|-----|-----|-----------|
| FROM/TO | VN1 | VN2 | P1 | TOTALRECV |
| VN1 | 2 | 2 | 8 | 11 |
| VN2 | 2 | 4 | 6 | 15 |
| TOTALSENT | 8 | 3 | 15 | |

Next, the system 200 determines if the row sums in matrix 2 match the total received values and whether the column sums match the total sent values (step 430). If all the row and column sums match the total received and sent values, processing stops (step 440), indicating that the matrix represents the projected traffic flows between the virtual nodes in the network, as described in more detail below.

In the example above, the row sums for VN1 is 2+2+8=12. Since 12≠11, processing continues. The other row sums and column sums also do not match the corresponding totals. When the row and column sums do not match the corresponding totals, the system 200 determines if any of the row or columns sums are greater than the corresponding sent or received totals (step 450). If the answer is "no," processing continues at step 470. In matrix 2 above, the observed flows sent to VN2 are 2+4=6, which is greater than the forecasted total of 3. Additionally, the sum of the observed flows transmitted from VN1 is 2+2+8=12, which is greater than the forecasted total of 11.

In this scenario, the system 200 scales down the original matrix until none of the row or columns sums are violated (step 460). That is, the system 200 scales down the matrix so that none of the row/column sums is greater that the corresponding total received/sent values, respectively. In the example above, the system 200 may scale the observed traffic values in matrix 2 by ½, thereby generating matrix 3.

MATRIX 3

| FROM/TO | VN1 | VN2 | P1 | TOTALRECV |
|---|---|---|---|---|
| VN1 | 1 | 1 | 4 | 11 |
| VN2 | 1 | 2 | 3 | 15 |
| TOTALSENT | 8 | 3 | 15 | |

From matrix 3, the system 200 then determines whether any row or column sum matches the corresponding total received/sent value and if any such row/column exists, the system 200 "freezes" the values in that row/column (step 470). That is, the system 200 will not change the values in that row/column for the remainder of the process. In the scenario above, the sum of column VN2 matches the total sent value (i.e., 1+2=3). The system 200, therefore, freezes these values in the VN2 column. The system 200 also subtracts the values associated with the frozen column from the total received value. The frozen entries represent the projected traffic flow between the corresponding nodes. For example, from matrix 3, the projected traffic flow from VN1 to VN2 is "1."

Removing the frozen column and updating the total received values produces the following matrix:

MATRIX 4

| FROM/TO | VN1 | P1 | TOTALRECV |
|---|---|---|---|
| VN1 | 1 | 4 | 10 |
| VN2 | 1 | 3 | 13 |
| TOTALSENT | 8 | 15 | |

The system 200 now determines whether the sum of entries in any row/column does not match the corresponding total received/sent value (step 480). If the answer is no, processing stops and the current matrix represents the final traffic matrix.

From matrix 4 above, the sum of entries in each of the row/columns does not match the corresponding total. In this case, the system 200 scales the matrix again until one of the row or column sums matches the corresponding total received or sent value (step 490). For example, scaling matrix 4 by two makes the first row the limiting row as shown below.

MATRIX 5

| FROM/TO | VN1 | P1 | TOTALRECV |
|---|---|---|---|
| VN1 | 2 | 8 | 10 |
| VN2 | 2 | 6 | 13 |
| TOTALSENT | 8 | 15 | |

Processing then returns to step 470. Since the sum of the values in row 1 equals the total received value (i.e., 2+8=10), the system 200 now freezes out the first row and updates the matrix as shown in matrix 6. As described previously, system 200 also subtracts the values associated with the frozen row from the corresponding total sent values.

MATRIX 6

| FROM/TO | VN1 | P1 | TOTALRECV |
|---|---|---|---|
| VN2 | 2 | 6 | 13 |
| TOTALSENT | 6 | 7 | |

Next, the system 200 scales the remaining two entries so that the flows match the total received and total sent values. That is, the system 200 scales the flow from VN2 to VN1 to 6 and the flow from VN2 to P1 to 7. Matrix 7 represents the final traffic matrix.

MATRIX 7

| FROM/TO | VN1 | VN2 | P1 | TOTALRECV |
|---|---|---|---|---|
| VN1 | 2 | 1 | 8 | 11 |
| VN2 | 6 | 2 | 7 | 15 |
| P1 | 0 | 0 | 0 | 0 |
| TOTALSENT | 8 | 3 | 15 | |

Matrix 7 now represents the forecasted traffic flows between the virtual nodes in the network. For example, the forecasted traffic flow from VN2 to VN1 is "6". This value may represent an average flow rate of 6 Mbps, or some other unit, over a defined period of time.

System planners may then map the data flows from the virtual nodes to physical locations. For example, assume that VN1 represents virtual node 110 in FIG. 1 and that VN2 represents virtual node 120. Each of these virtual nodes 110 and 120 may then be mapped to physical locations.

For example, virtual node 110 may represent a POP in Boston and virtual node 120 may represent a POP in Atlanta. The system planner then uses matrix 7 to determine that the projected flow from the POP in Atlanta (VN2) to the POP in Boston (VN1) is 6 Mbps. The virtual nodes may be mapped to other physical locations, in implementations consistent with the present invention, based on the particular network topology.

According to an exemplary implementation, the system planner may use the information in the final traffic matrix to determine circuit utilization information based on the projected traffic. That is, the system planner may determine whether the current circuits will be able to meet the projected demand. The system planner may also determine how many circuits will be needed to adequately meet the projected traffic demand and whether a particular network topology will be adequate to handle this projected data traffic.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the following claims and their equivalents.

For example, the invention has been described in relation to a virtual node model. The present invention is not limited to forecasting traffic using a virtual node model, however, and may be used with any network topology.

What is claimed is:

1. A method for analyzing traffic in a first network and peer network, the first network and the peer network comprising a plurality of nodes; the method comprising:

forecasting traffic transmitted to and from each of the plurality of nodes based on observed traffic statistics and an estimated grow, the estimated growth determined in part based on an amount of traffic staying within the first network that is not sent to or received from a node belonging to the peer network;

generating a traffic matrix using the observed traffic statistics and the forecasted traffic associated with each of the plurality of nodes; and determining projected traffic between each of the plurality of nodes using the generated traffic matrix.

2. The method of claim 1, further comprising:

determining network utilization information based on the projected traffic.

3. The method of claim 2, further comprising:

generating network requirements based on the network utilization information.

4. The method of claim 1, wherein each of the plurality of nodes represents a number of traffic sources and destinations, wherein the forecasting includes:

summing the traffic transmitted to/from each of the number of traffic sources and destinations.

5. The method of claim 1, wherein the traffic matrix includes a plurality of entries representing a plurality of rows and columns, wherein the determining includes:

determining whether the sum of the entries representing the observed traffic statistics associated with a node are equal to the entry representing the forecasted traffic associated with the node, and freezing the corresponding entries in the matrix when the sum of entries equals the entry representing the forecasted traffic, wherein the frozen entries represent the projected traffic.

6. The method of claim 5, further comprising:

scaling the traffic matrix so that the sum of entries in each of the respective rows and columns are equal to a corresponding forecasted traffic.

7. A system for analyzing traffic in a first network and a peer network, the first network and the peer network comprising a plurality of nodes, the system comprising:

a memory configured to store observed traffic statistics; and a processor configured to:

forecast traffic transmitted to and from each of the plurality of nodes based on observed traffic statistics and an estimated growth, the estimated growth determined in part based on an amount of traffic staying within the first network that is not sent to or received from a node belonging to the peer network, generate a traffic matrix using the observed traffic statistics and a forecasted amount of traffic associated with each of the plurality of nodes, and determine projected traffic between each of the plurality of nodes using the generated traffic matrix.

8. The system of claim 7, wherein the processor is further configured to: determine network utilization information based on the projected traffic.

9. The system of claim 8, wherein the processor is further configured to:

generate network requirements based on the network utilization information.

10. The system of claim 7 wherein each of the plurality of nodes represents a virtual node including a number of traffic sources and destinations, and when forecasting, the processor is configured to:

sum the traffic transmitted to/from each of the number of traffic sources and destinations.

11. The system of claim 7, wherein the traffic matrix includes a plurality of entries representing a plurality of rows and columns, wherein when determining, the processor is configured to:

determine whether the sum of the entries in a row/column representing the observed traffic statistics associated with a node are equal to the entry representing the forecasted traffic associated with the node, and freezing the corresponding entries in the row/column when the sum of entries equals the entry representing the forecasted traffic, wherein the frozen entries represent the projected traffic.

12. The system of claim 11, wherein the processor is further configured to: scale the traffic matrix so that the sum of entries in each of the respective rows and columns are equal to the corresponding forecasted traffic.

13. A computer-readable medium having stored thereon a plurality of sequences of instructions, said instructions including sequences of instructions which, when executed by a processor, cause said processor to perform the steps of:

forecasting traffic transmitted to and from each of a plurality of nodes in a first network and a peer network based on observed traffic statistics and an estimated growth, the estimated growth determined in part based on an amount of traffic staying within the first network that is not sent to or received from a node belonging to the peer network;

generating a traffic matrix using the observed traffic statistics and the forecasted traffic associated with each of the plurality of nodes; and determining projected traffic between each of the plurality of nodes using the generated traffic matrix.

14. The computer-readable medium of claim 13, including instructions for causing said processor to perform the further step of:

determining network utilization information based on the projected traffic.

15. The computer-readable medium of claim 14, including instructions for causing said processor to perform the further step of:

generating network requirements based on the network utilization information.

16. The computer-readable medium of claim 13, wherein each of the plurality of nodes represents a number of traffic sources and destinations, wherein the forecasting includes:

summing the traffic transmitted to/from each of the number of traffic sources and destinations.

17. The computer-readable medium of claim 13, wherein the traffic matrix includes a plurality of entries representing a plurality of rows and columns, wherein the determining includes:

determining whether the sum of the entries representing the observed traffic statistics associated with a node are equal to the entry representing the forecasted traffic associated with the node, and freezing the corresponding entries in the matrix when the sum of entries equals the entry representing the forecasted traffic, wherein the frozen entries represent the projected traffic.

18. The computer-readable medium of claim 17, including instructions for causing said processor to perform the further step of:

scaling the traffic matrix so that the sum of entries in each of the respective rows and columns are equal to the corresponding forecasted traffic.

19. A traffic analyzer, comprising:

means for forecasting traffic transmitted to and from each of a plurality of nodes that belong to a first network and a peer network;

means for generating a traffic matrix using observed traffic statistics and the forecasted traffic associated with each of the plurality of nodes the forecasted traffic determined in part based on an amount of traffic staying within the first network that is not sent to or received from a node belonging to the peer network; and means for calculating traffic between each of the plurality of nodes using the generated traffic matrix.

20. A method for forecasting traffic in a network comprising a plurality of nodes, wherein a first group of nodes represent virtual nodes with each virtual node including a number of traffic sources and destinations associated with a plurality of network service types provided by a first network service provider, and a second group of nodes represent at least one peer network associated with a different network service provider, the method comprising:

forecasting, for each of the virtual nodes, total transmitted and received traffic values associated with each of the network service types based on observed statistics and an estimated growth;

determining the total traffic transmitted to/from the first group of nodes from/to the at least one peer network; and determining the total transmitted and received traffic for each of the virtual nodes using the forecasted total transmitted and received traffic values and the determined total traffic associated with the at least one peer network.

21. The method of claim 20, further comprising:

receiving a scale factor representing a projected increase in traffic for each of the respective network service types and wherein the forecasting includes:

forecasting the total transmitted and received traffic using the respective scale factors.

22. The method of claim 20, wherein the forecasting includes:

forecasting the total transmitted and received traffic value associated with each of the respective service types based on at least of a unit growth forecast representing a projected increase in units associated with each service type, a load growth forecast representing an increase in traffic associated with each service type, a sent/received ratio associated with each service type and value representing the portion of traffic for each service type that stays within the first group of nodes.

23. The method of claim 20, wherein the determining the total transmitted and received traffic includes:

summing the total transmitted and received traffic values associated with each of the respective network service types for each of the virtual nodes.

24. A computer-readable medium having stored thereon a plurality of sequences of instructions, said instructions including sequences of instructions which, when executed by a processor, cause said processor to perform the steps of:

forecasting, for each of a plurality of virtual nodes in a network where each virtual node includes a number of traffic sources and destinations associated with a plurality of network service types provided by a first network service provider, total transmitted and received traffic values associated with each of the network service types based on observed statistics and an estimated growth;

determining traffic transmitted to/from each of the plurality of virtual nodes from/to at least one peer network, wherein the at least one peer network is associated with a different network service provider; and calculating a total transmitted and received traffic for each of the virtual nodes.

25. The computer-readable medium of claim 24, including instructions for causing said processor to perform the further step of:

receiving a scale factor for each of the respective network service types and wherein the forecasting includes:

forecasting the total received and sent traffic using the respective scale factors.

26. The computer-readable medium of claim 24, wherein the forecasting includes:

forecasting the total transmitted and received traffic value associated with each of the respective service types based on at least of a unit growth forecast representing a projected increase in units associated with each service type, a load growth forecast representing an increase in traffic associated with each service type, a sent/received ratio associated with each service type and value representing the portion of traffic for each service type that stays within the first group of nodes.

27. The computer-readable medium of claim 24, wherein the calculating includes:

summing the total transmitted and received traffic values associated with each of the network service types for each of the virtual nodes.

28. A method for analyzing traffic in a first network and a peer network, the first network and the peer network comprising a plurality of nodes, the method comprising:

generating a first traffic matrix using observed traffic statistics and projected traffic values associated with each of the plurality of nodes;

scaling the first traffic matrix based on a comparison of a sum of select ones of the observed traffic statistics and a projected traffic value; and generating a second traffic matrix based on the scaling, the second traffic matrix including a plurality of entries representing the projected traffic between each of the plurality of nodes.

29. A computer-readable medium having stored thereon a plurality of sequences of instructions, said instructions including sequences of instructions which, when     executed by a processor, cause said processor to perform the steps of:

generating a first traffic matrix using observed traffic statistics and projected traffic values associated with each of a plurality of nodes in a network;

scaling the first traffic matrix based on a comparison of a sum of select ones of the observed traffic statistics and a projected traffic value; and         generating a second traffic matrix based on the scaling, the second traffic matrix including a plurality of entries representing the projected traffic between each of the plurality of nodes.

30. A method for analyzing traffic in a network comprising a plurality of nodes; the method comprising:

forecasting traffic transmitted to and from each of the plurality of nodes based on observed traffic statistics and an estimated growth;

generating a traffic matrix using the observed traffic statistics and the forecasted traffic associated with each of the plurality of nodes; and     determining projected traffic between each of the plurality of nodes using the generated traffic matrix;

wherein the traffic matrix includes a plurality of entries representing a plurality of rows and columns;

wherein the determining includes:

determining whether the sum of the entries representing the observed traffic statistics associated with a node are equal to the entry representing the forecasted traffic associated with the node, and         freezing the corresponding entries in the matrix when the sum of entries equals the entry representing the forecasted traffic, wherein the frozen entries represent the projected traffic.

* * * * *

UNITED STATES PATENT AND TRADEMARK OFFICE
CERTIFICATE OF CORRECTION

PATENT NO. : 6,725,263 B1  Page 1 of 1
APPLICATION NO. : 09/531882
DATED : April 20, 2004
INVENTOR(S) : Torres It is certified that error appears in the above-identified patent and that said Letters Patent is hereby corrected as shown below:

Column 11 at line 18 before "peer" insert --a--
Column 11 at line 22 delete "grow" and insert --growth--
Column 11 at line 23 delete "staving" and insert --staying--

Signed and Sealed this

Twenty-ninth Day of May, 2007

JON W. DUDAS
*Director of the United States Patent and Trademark Office*